UNITED STATES PATENT OFFICE.

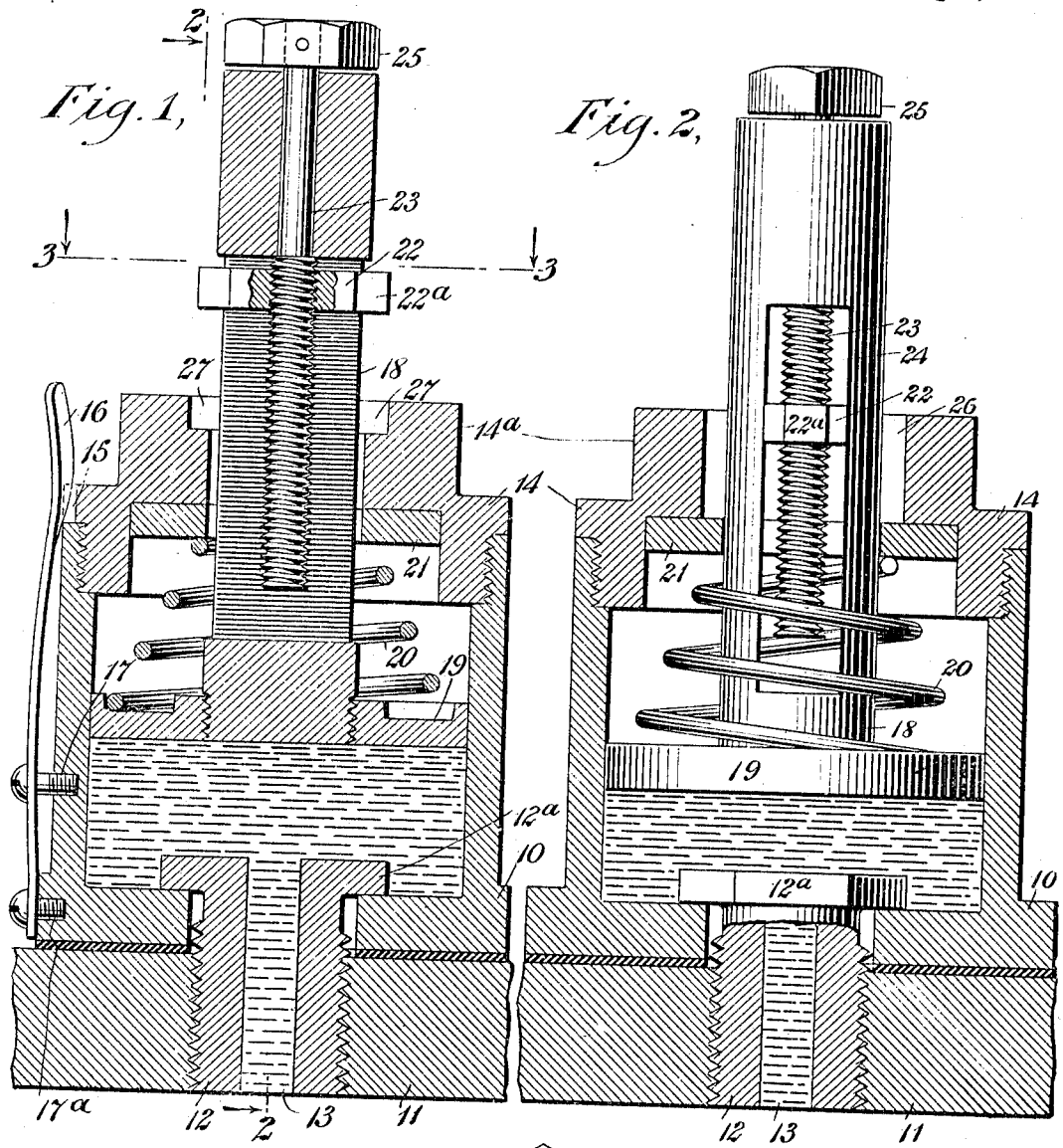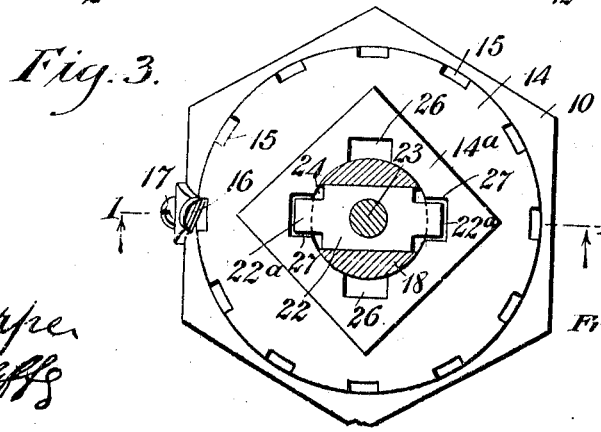

ROY MERL MUSGROVE AND FRED R. HOWARD, OF SALT LAKE CITY, UTAH.

GREASE-CUP.

1,106,153. Specification of Letters Patent. Patented Aug. 4, 1914.

Application filed February 4, 1914. Serial No. 816,491.

*To all whom it may concern:*

Be it known that we, ROY M. MUSGROVE and FRED R. HOWARD, citizens of the United States, and both residents of Salt Lake City, in the county of Salt Lake and State of Utah, have invented a new and Improved Grease-Cup, of which the following is a full, clear, and exact description.

Our invention relates to grease cups having a spring-pressed piston to force the grease from the cup to the member to be lubricated.

The invention is applicable to the rotary parts of locomotives, stationary and traction engines, and other machinery.

The invention resides in certain features relating to the piston and piston rod, whereby to limit the forward movement of the piston under the action of the spring, so as to limit the total feed of the piston to any desired extent, the adjusting means being capable of holding the piston in retracted position against the movement of the spring, thereby cutting out the automatic feed feature.

The invention will be particularly explained in the specific description following.

Reference is to be had to the accompanying drawings forming a part of this specification, in which similar characters of reference indicate corresponding parts in all the views.

Figure 1 is a longitudinal vertical section on the line 1—1 of Fig. 3; Fig. 2 is a similar section at right angles to the section shown in Fig. 1; and Fig. 3 is a plan view with parts in section, on the line 3—3 of Fig. 1.

In constructing a grease cup embodying our invention in accordance with the particular practical embodiment illustrated, the body 10 of the cup is made of any suitable capacity and shape to adapt it to the particular machine element 11. A screw plug 12 is provided to engage the machine element 11, and has a through bore 13 for the delivery of the lubricant. The upper end of the screw plug is shown as provided with a flange 12$^a$ to clamp the bottom of the cup 10.

The cap 14 has threaded engagement with the cup 10 and in order to lock the cap in any position to which it has been screwed on the cup 10, peripheral recesses 15 are formed in the cap and adapted to receive a plate spring 16, which is suitably secured to the cup 10 as by set screws 17, 17$^a$. So long as the cap is engaged even by one thread, it will be maintained by the spring 16 against displacement.

The piston rod 18 is movable through the cap 14 and carries a piston 19 operating in the cup 10 under the influence of a helical spring 20, which surrounds the piston rod and bears at its lower end against the back of the piston, the upper end of the spring abutting the cup 14 or an interposed washer or packing disk 21.

In order to provide for limiting the forward movement of the piston 19, whereby to limit the total feed of the piston under the influence of the spring 20, a stop 22 is provided in connection with the piston rod 18. Said stop is threaded on a spindle 23 and operates in an elongated slot 24 extending transversely through the piston rod. The end lugs 22$^a$ of the stop project laterally beyond the piston rod and may be caused to engage with the cap 14. The outer end of the spindle 23 has a head 25 for turning the spindle, whereby to adjust the position of the stop 22.

When it is desired to have the piston 19 free to feed the complete charge of grease in the grease cup, the lugs 22$^a$ of the stop 22 will be so positioned as to be in register with passages 26 that extend through the cap 14$^a$, a sufficient distance to permit the piston to be moved substantially to the bottom of the grease cup. The piston rod is capable of being turned in the cap 14 so as to dispose the lugs 22$^a$ of the stop 22 out of register with the passages 26 and to be in line with blind recesses 27, in the form of depressions in the face of the cap, said recesses being in angular position relatively to the passages 26. With the lugs 22$^a$ in line with the recesses 27, the forward movement of the piston will be limited by the engagement of the lugs 22$^a$ in the recesses. Since the turning of the threaded spindle 23 will advance or retract the stop 22, the latter may be advanced to a position such that when engaged in the recesses 27, the spring 20 will be compressed and the piston 19 held at the upper end of the cup; thus the automatic feed feature will be eliminated.

The cap 14 may have a squared boss 14$^a$ for receiving a wrench if desired.

Having thus described our invention, we claim as new and desire to secure by Letters Patent:

1. A grease cup having a cap, a spring pressed piston in the cup having a piston rod extending through the cap, and a stop on the piston rod, the cap having a passage to permit the stop to pass through the cap, to afford freedom for the piston to move forwardly, and said stop being movable to a position out of line with the said passage to arrest the forward movement of the piston.

2. A grease cup having a cap, a piston operating in the cup and having a piston rod passing through the cap, said rod being formed with an elongated slot extending transversely through the rod, means to advance the piston, a threaded spindle ranging longitudinally of the piston rod to turn relatively to the latter, and a stop disposed in the slot of the piston rod and having threaded engagement with the spindle, said stop being adapted to contact with the cap and limit the forward movement of the piston.

3. A grease cup having a cap, a spring-pressed piston in said cup having a piston rod extending through the cap, and having an elongated slot extending transversely, a spindle ranging longitudinally of the piston rod, and a stop threaded on the spindle and formed with lugs projecting laterally beyond the piston rod, the cap having passages for the stop and its lugs, permitting a forward movement of the piston, the cap furthermore having depressions disposed angularly to the passages, whereby to arrest the lugs and limit the forward movement of the piston.

In testimony whereof we have signed our names to this specification in the presence of two subscribing witnesses.

ROY MERL MUSGROVE.
FRED R. HOWARD.

Witnesses as to Roy Merl Musgrove:
  Mrs. NEWTON KELLY,
  ORSON DAVIS.

Witnesses as to Fred R. Howard:
  A. T. MOORE,
  E. J. WILLS.

---

Copies of this patent may be obtained for five cents each, by addressing the "Commissioner of Patents, Washington, D. C."